United States Patent

[11] 3,627,053

| [72] | Inventors | Richard Wayne Hook<br>Des Moines;<br>William Wayne Jackson, Altoona; Lamar William, Cedar Falls; Kenneth Earl Murphy, both of Cedar Falls, all of Iowa |
|---|---|---|
| [21] | Appl. No. | 819,615 |
| [22] | Filed | Apr. 28, 1969 |
| [45] | Patented | Dec. 14, 1971 |
| [73] | Assignee | Deere & Company<br>Moline, Ill. |

[54] HYDRAULIC POWER LIFT SYSTEM FOR TRACTOR AND TRAILING IMPLEMENT
20 Claims, 2 Drawing Figs.

[52] U.S. Cl.................................................. 172/9,
172/316, 172/413, 91/412
[51] Int. Cl.......................................................A01b 63/112,
A01b 63/22, F15b 11/00
[50] Field of Search.......................................... 280/43.23,
405; 172/7, 9, 316, 413; 60/52 HE; 91/411, 412

[56] References Cited
UNITED STATES PATENTS

| 3,486,761 | 12/1969 | Fay.............................. | 280/43.23 |
| 2,112,466 | 3/1938 | Maloon........................ | 60/52 HE |
| 2,637,259 | 5/1953 | Acton........................... | 172/316 |
| 2,974,733 | 3/1961 | Fletcher...................... | 172/7 |
| 3,246,700 | 4/1966 | Smelcer...................... | 172/7 |
| 3,356,382 | 12/1967 | Fay.............................. | 172/316 X |
| 3,411,800 | 11/1968 | Krumholz.................... | 91/411 X |
| 3,476,016 | 11/1969 | Dixon et al. ................ | 91/411 |
| 3,487,882 | 1/1970 | Burton........................ | 172/413 X |

*Primary Examiner*—Robert E. Pulfrey
*Assistant Examiner*—Stephen C. Pellegrino
*Attorneys*—H. Vincent Harsha, Harold M. Knoth, William A. Murray and John M. Nolan ABSTRACT: A tractor and trailing earthworking implement combination in which the implement includes a transverse series of frames pivotally connected together and mounted on vertically movable wheels operated by a plurality of series connected double-acting hydraulic cylinders which are connected to the tractor position and draft responsive hydraulic power lift system in series with the tractor rockshaft cylinder so that the implement frames are raised or lowered in unison and in substantially equal amounts in response to variations in draft loads.

Patented Dec. 14, 1971
3,627,053
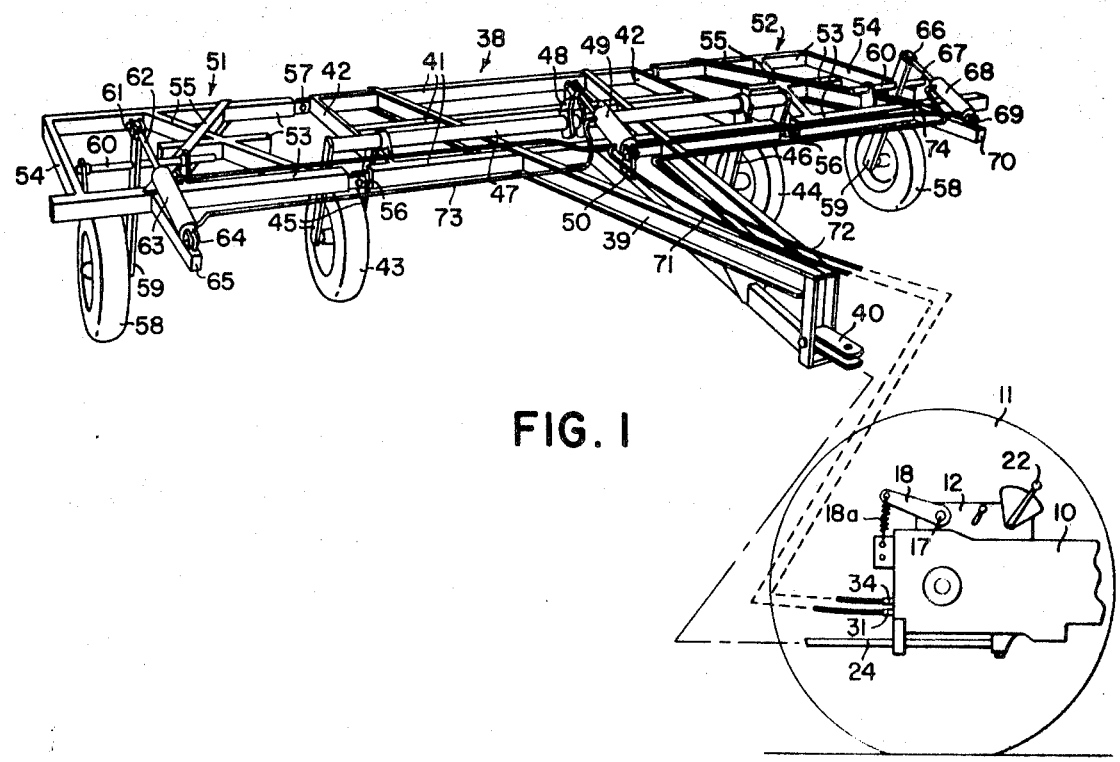
FIG. I
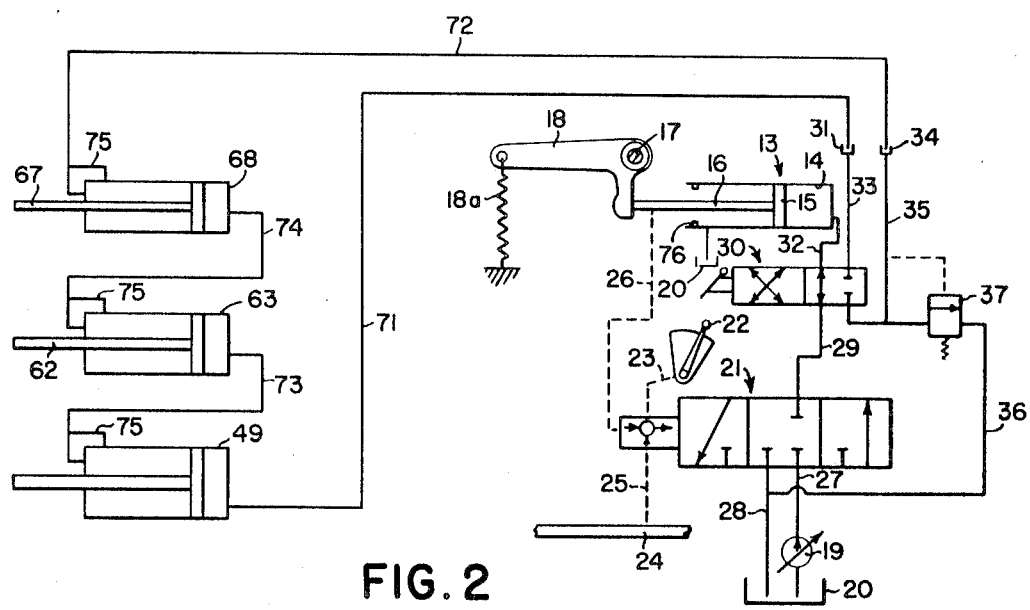
FIG. 2
INVENTORS.
R. W. HOOK
W. W. JACKSON
L. WILLIAMS
K. E. MURPHY

HYDRAULIC POWER LIFT SYSTEM FOR TRACTOR AND TRAILING IMPLEMENT

BACKGROUND OF THE INVENTION

The present invention relates generally to a tractor-implement arrangement, and more particularly relates to an improved tractor-implement draft responsive hydraulic power lift system for trailing earthworking implements.

It is well known to connect an integral implement with a tractor in such a manner that variations in the draft load imposed upon the implement are signaled to appropriate means on the tractor, such as a fluid control valve, for supplying and exhausting a tractor-mounted hydraulic motor which will in turn change the vertical adjustment of the implement to accommodate the changes in draft load. As shown in U.S. Pats. No. 2,974,733 issued Mar. 14, 1961 to E. H. Fletcher and No. 2,996,125 issued Aug. 15, 1961 to E. V. Bunting, such systems have been extended to a fluid motor located remotely from the tractor and operative on a trailing rather than an integral implement. However, the extension of the system to trailing implements has been restricted to the so-called rigid implements, such as plows, in which a single remote fluid motor could control the vertical adjustment of the entire implement. Even though the hydraulic power lift systems for flexible implements have been greatly improved, as exemplified by copending U.S. application Ser. No. 753,337, prior to the present invention there has not been a tractor and trailing flexible implement combination in which the implement power lift system is integrated with the tractor position and draft responsive power lift system in such a manner that each frame of the flexible implement is automatically vertically adjusted to accommodate changes in the draft load simultaneously with and in equal amounts to the adjustment of the other frames.

SUMMARY OF THE INVENTION

An object of the present invention is to provide a tractor and trailing flexible implement combination in which the implement includes a transverse series of frames pivotally connected at adjoining ends for independent vertical movement, and in which the frames of the implement are automatically vertically adjusted in unison and to substantially equal distances above the ground surface beneath the respective frames in response to variations in the draft load.

A more specific object of the invention is to provide a tractor and trailing flexible implement combination in which a plurality of hydraulic motors are employed to vertically adjust the independently movable frames of a flexible implement, the hydraulic motors being connected in series and integrated into the tractor draft responsive hydraulic power lift circuit so that all the frames of the flexible implement are automatically vertically adjusted in unison to accommodate changes in the draft load.

A further object of the invention is to provide a tractor and trailing implement arrangement in which a remote cylinder for controlling the vertical adjustment of the trailing implement is connected in series to the tractor-mounted cylinder so that the implement is automatically raised and lowered in response to changes in the draft load, and in which the remote cylinder is provided with a bypass circuit and a pressure relief valve is provided between the remote and tractor-mounted cylinders whereby the cylinders will move into phase with each other when they are moved to their limit in one direction to thereby compensate for fluid leakage.

The above objects and additional objects and advantages of the invention will become apparent to those skilled in the art from a reading of the following detailed description when taken in conjunction with the accompanying drawings in which a preferred embodiment of the invention is illustrated.

BRIEF DESCRIPTION OF THE DRAWING

In the drawing:

FIG. 1 is a view of a tractor and implement combination according to the present invention, the implement being shown in perspective and the tractor illustrated in side elevation with the near wheel removed to expose major portions of the hitch and control system; and FIG. 2 is a schematic view of the hydraulic system.

DESCRIPTION OF THE PREFERRED EMBODIMENT

The tractor illustrated in the drawing is for the most part of conventional construction and includes a main body 10 carried on front steerable wheels (undisclosed) and rear traction wheels 11, only one of the latter being illustrated. The rear portion of the tractor body carries a housing 12 which contains a tractor-mounted hydraulic motor indicated generally 13. In its basic form, the housing 12 includes an internal cylinder 14 in which a piston 15 travels to transmit force via a piston rod 16 to a tractor-mounted rockshaft 17. The rockshaft extends beyond the sides of the housing 12 and has lift arms 18 secured to its opposite ends. For reasons which will be explained hereinafter, a tension spring 18a acts on the arms 18 to bias the piston 15 toward the anchor end of cylinder 14. The basic tractor also includes a source of fluid pressure such as a constant pressure variable displacement pump 19, a fluid reservoir 20 and a servocontrol valve indicated generally at 21.

As is conventional, the control valve 21 is under the control of three initiating sources, a manual control, a draft responsive control and a position responsive control. The manual control takes the form of a rockable and selectively setable hand lever 22 mounted on the tractor in any suitable fashion and connected remotely via suitable linkage represented by the dotted lines 23 in FIG. 2 to the control valve 21. The draft responsive control includes the tractor drawbar 24 which signals the draft loads to the control valve 21 by a suitable linkage represented by the dotted lines 25 in FIG. 2. The position responsive control signals the relative angular position of the rockshaft 17 to the control valve 21 by a suitable linkage represented by the dotted lines 26 in FIG. 2. The construction and operation of the control valve 21 and its three initiating sources of control are all conventional and need not be elaborated. However, if necessary, a full understanding of the construction and operation of the same can be had by referring to the previously mentioned U.S. Pat. No. 2,974,733.

As can be seen in FIG. 2, one side of the control valve 21 is connected to the pump 19 and the reservoir 20 by fluid lines 27 and 28 respectively. The other side of the control valve 21 is connected by a fluid line 29 to a first side of a manually operable selector valve 30. The second side of the selector valve 30 is connected to the hydraulic motor 13 and a remote cylinder outlet 34 by fluid line 35 and to the sump 20 by fluid line 36. A pressure relief valve 37 is interposed in the fluid line 36 and prevents the flow of fluid through the fluid line 36 until the fluid pressure within line 35 exceeds a predetermined value. The pressure relief valve 37 is of the adjustable type so that the pressure required to open the valve may be varied for a purpose which will be explained hereinafter. The selector valve 30 is manually shiftable between a first position in which it connects the hydraulic motor 13 directly with the control valve 21 as illustrated in FIG. 2 and a second position in which it connects the hydraulic motor 13 with the remote cylinder outlet 34 and the control valve 21 with the remote cylinder outlet 31.

An exemplary implement which may form part of the combination according to the invention includes a center frame 38 having a forwardly extending draft frame 39 carrying at its forward end a clevis 40 which is secured to the tractor drawbar 24. The center frame includes a plurality of transversely extending tool bars 41 to which various earthworking tools such as chisel plows may be secured. The tool bars are interconnected by longitudinally extending side rails 42 and the rear end of the draft frame 39. A pair of ground-engaging wheels 43 and 44 are carried at the opposite sides of the center frame 38 by downwardly extending crank arms 45 and 46 which are in turn secured to the ends of a rockshaft 47. An intermediate portion of the rockshaft 47 carries upstanding crank arms 48. A hydraulic motor in the form of an extensible and retractable double-acting cylinder 49 has its rod end pivotally secured to the arms 48 and its anchor end pivotally secured to a bracket 50 carried by the draft frame 39. The cylinder 49 is utilized to rock the rockshaft 47 to raise and lower the center frame 38 on wheels 43 and 44.

A pair of outrigger frames are indicated generally at 51 and 52 and each includes front, rear and intermediate tool bars 53 to which various earthworking tools may be secured and which are interconnected by a longitudinally extending outer rail 54 and cross braces 55. The outrigger frames 51 and 52 are secured to opposite sides of the center frame 10 for vertical pivotal movement about longitudinally extending axes defined by front and rear pivot bolts 56 and 57 respectively. Each outrigger frame carries its own ground-engaging wheel 58 carried by a crank arm 59 which in turn is carried by a rockshaft 60. The upper end of the crank arm 59 on the left outrigger frame as viewed in FIG. 1 is pivotally connected to a yoke 61 carried on the other end of the piston rod 62 of a hydraulic cylinder 63. The anchor end 64 of the cylinder 63 is pivotally connected to a bracket carried by associated framework 65. The upper end of the crank arm 59 on the right outrigger frame is pivotally secured to a yoke 66 on the outer end of the piston rod 67 of a cylinder 68. The anchor end 69 of the cylinder 68 is pivotally secured to a bracket carried by associated framework 70.

The hydraulic cylinders 49, 63 and 68 which raise and lower the frames of the implement are connected to the hydraulic power lift system of the tractor and are also connected in series. To this end, the cylinder 49 which is first in the series when raising the implement frames has its anchor end connected to the remote cylinder outlet 31 on the tractor by a fluid line 71. Similarly, the cylinder 68 which is last in the series has its rod end connected with remote cylinder outlet 34 by a fluid line 72. The intermediate cylinder 63 has its anchor end connected with the rod end of the cylinder 49 by a fluid line 73 and its rod end connected with the anchor end of the cylinder 68 by a fluid line 74.

Each of the cylinders 49, 63 and 68 is provided with bypass circuit 75 at its rod end which permits the flow of fluid through the cylinder when it has been fully extended. The purpose of the bypass circuit 75 will become apparent hereinafter.

The displacement of implement-mounted cylinders is so matched that movement of any given piston rod will be accompanied by equal movement of other piston rods. For example, the fluid displaced from the rod end of the cylinder 49 for a given movement of the piston rod associated with the cylinder 49 will equal the amount of fluid needed within the anchor end of the cylinder 63 to move the piston rod 62 an equal amount and the fluid displaced from the rod end of the cylinder 63 for the movement of the rod 62 will equal the amount of fluid needed within the anchor end of the cylinder 68 to move the piston rod 67 an equal amount. The size of the cylinders 49, 63 and 68 are also selected so that the fluid displaced from the rod end of the cylinder 68 during the total outward stroke of the rod 67 will substantially equal or be greater than the amount of fluid needed within the anchor end of the tractor-mounted cylinder 14 to drive the piston rod 16 through its entire outward stroke.

The operation of the above-described tractor and implement combination is as follows:

When the implement is connected to the tractor drawbar and the fluid lines 71 and 72 are connected to the remote cylinder outlets 31 and 34, the tractor operator will move the selector valve 30 to the right to interconnect the hydraulic motor 13 with the remote cylinder outlet 34 and the control valve 21 with the remote cylinder outlet 31. The tractor operator then selects whether he wants the control valve 21 to be responsive to the draft loads imposed upon the implement, the position of the rockshaft 17, or a combination of the draft loads and the position on the rockshaft 17 in the manner described in the previously mentioned U.S. Pat. No. 2,974,733. In the following description of operation it will be assumed that the control valve 21 is responsive only to the manual control and the draft-responsive control.

When it is desired to lower the implement frames to their working positions, the hand lever 22 is moved downwardly along its quadrant to move the control valve 21 to the right to its exhaust position in which the fluid line 29 is connected with the sump 20. With the control valve 21 in its exhaust position, the weight of the center frame 38 will move the piston rod of the cylinder 49 inwardly and force fluid from the anchor end thereof through the fluid lines 71, 33, 29 and 28 to the sump 20. At the same time, the weight of the outrigger frames 51 and 52 will push the piston rods 62 and 67 inwardly to force fluid from the anchor end of cylinder 63 to the rod end of cylinder 49 and from the anchor end of cylinder 68 to the rod end of cylinder 63. Simultaneously with the lowering movement of the frames, the spring 18a will force the piston 15 of the hydraulic motor 13 inwardly and displace the fluid from the anchor end of the cylinder 14 through the hydraulic lines 32, 35 and 72 to the rod end of the cylinder 68. As the implement frames are lowered, the earthworking tools mounted thereon will move into the earth and their resistance to movement through the earth imposes draft loads on the implement frames. The draft loads imposed upon the implement frames are transmitted through the implement draft frame 39, the draw bar 24 and linkage 25 to the control valve 21. As the draft loads increase due to movement of the earthworking tools into the earth, the draft responsive control begins to move the control valve 21 back to its neutral position. When the draft load has reached the value selected by the position of the hand lever 22, the draft responsive control will have moved the control valve 21 to the neutral position. When the control valve 21 is in the neutral position, the implement frames are locked within their vertically adjusted positions until the hand lever 22 is moved or until some change occurs in that draft load due to changes in the soil condition or the like.

As the tractor and implement progess over the field being worked, should and area of high density soil be encountered the draft load imposed on the implement will be increased, and the increased draft load will be signaled to the control valve 21 will be moved to the left toward its supply position where the fluid line 29 will be connected to the pump 19. The pump 19 will supply fluid pressure to the anchor end of the cylinder 49 to extend its piston rod and raise the center frame 38. AS the piston rod of the cylinder 49 is extended, fluid will be forced from the rod end of the cylinder 49 to the anchor end of the cylinder 63 to extend the piston rod 62 and raise the outrigger frame 51. Simultaneously, fluid will be displaced from the rod end of the cylinder 63 into the anchor end of the cylinder 68 to extend the rod 67 to raise the outrigger frame 52. Also, simultaneously with the raising of the implement frames, fluid exhausted from the rod end of the cylinder 68 will be routed to the anchor end of the cylinder 14 to extend the piston rod 16. When the implement frames have been raised a sufficient distance to decrease the draft load back to that value selected by the position of the hand lever 22, the draft responsive control will move the control valve 21 back to its neutral position. If the draft load imposed upon the implement drops below the value selected by the position of the hand lever 22, the draft responsive control will move the control valve 21 to lower the implement frame until the select draft load is again achieved.

To fully raise the implement so that the tools mounted thereon are removed from the ground, it is only necessary to move the hand lever 22 to the top of its associated quadrant so that the control valve 21 is moved to its supply position. With the control valve 21 in supply position, fluid from the pump 19 will flow to the lines 29, 33 and 71 to the anchor end of the cylinder 49. As fluid under pressure enters the anchor end of the cylinder 49, the piston within cylinder 49 is moved toward the rod end of the cylinder, displacing fluid through the line 73 into the anchor end of the cylinder 63, in turn causing the piston within cylinder 63 to move towards the rod end thereof, displacing fluid through the line 74 into the anchor end of the cylinder 68 which in turn causes the piston within cylinders 68 to move towards the rod end thereof and thus displace fluid through the lines 72, 35 and 32 into the anchor end of the tractor-mounted hydraulic motor 13. During the outward movement of the pistons during lifting of the implement, should any one of the pistons reach the end of its stroke before the other pistons reach the outer end of their strokes, fluid will bypass that piston to allow the other pistons to reach the ends of their strokes. For example, should the piston within cylinder 49 bottom out on the rod end of the cylinder before the pistons within cylinder 63, 68 and 14 bottom out, continued fluid movement is provided through the bypass 75. Similarly, if the piston 15 should bottom out against the stop 76 before the pistons within cylinders 49, 63 and 68 bottom out, fluid pressure within the line 35 will open the bypass valve 37 and provide for continued fluid movement through the line 36 to the sump 20. When the hand lever 22 is moved to the position corresponding to the full raised position of the implement, the draft responsive control will be inoperative to return the control valve 21 to its neutral position so fluid pressure at the rated pressure of the constant pressure pump 19 will be continuously supplied to the hydraulic cylinders and returned to the sump 20 through the pressure relief valve 37.

It should be noted that the cylinders are so connected with the pump 19 when raising the implement that fluid will first flow through the largest and then the sequentially smaller cylinders. By employing this arrangement, maximum lift is determined by the effective cross sectional area of the anchor end of the largest cylinder 49. In this respect, it should also be noted that the pressure relief valve 37 which provides for the synchronization of the cylinder 14 with the remote cylinders also protects the cylinder 14 from damage due to excessively high pressure which may result from pressure jacking through the remote cylinders. Pressure jacking is the result of increased pressure through the series of cylinders due to the reduced volume through the series.

As previously mentioned, the above description was on the assumption that the control valve 21 was not influenced in any respect by the position responsive control. With the control linkage adjusted so that the control valve 21 is not influenced by the position of the rockshaft 17, it is not necessary that the cylinder 14 be synchronized with the remote cylinders. However, as is conventional, it is also possible to adjust the control linkage so that the control valve 21 is solely responsive to the position of the rockshaft or it can be adjusted so that the control valve 21 is responsive to a combination of the draft loads and the position of the rockshaft 17. In the latter two cases, it is absolutely essential that the cylinders 14 be synchronized with or travel a distance which is a predetermined percentage of the travel of the remote cylinders in order for the remote cylinders to extend or retract the exact distance indicated by the movement of the hand lever 22. In this respect, it should be noted that, when retracting the remote cylinders to lower the implement, the spring 18a will push the piston 15 inwardly to prevent cavitation between the cylinders 14 and 68 so that the remote cylinders cannot move ahead of the tractor-mounted cylinder.

It should be noted that in the above-described embodiment of the invention pressure jacking will occur only under special circumstances, but under normal conditions, a great amount of power is expended in raising the frames, and the fluid pressure that reaches the hydraulic motor 13 will be well below the rated pressure of the pump 19. Therefore, in order to operate under normal conditions it is essential that the setting of the pressure relief valve be low enough to open at a pressure slightly less than the pressure available to the motor 13, but at the same time must be high enough to insure that the motor 13 is extended. Furthermore, the pressure available to the motor 13 will vary with implements of different sizes and the type and amount of tools mounted on the implement frames so the valve 37 must be adjusted to different settings for different implements.

The necessity to vary the setting of the pressure relief valve 37 for different implements can be overcome by providing the hydraulic motor 13 with a positive bypass such as a bypass circuit similar to the bypass circuits 75 for the remote motors or a poppet valve, either of which would return fluid directly to the reservoir when the motor 13 is fully extended. With such a positive bypass, the pressure relief valve 37 would be required only to protect the motor 13 from excessive pressure so it could be permanently set at approximately the maximum system pressure.

While preferred embodiments of the invention have been illustrated and described, it will be apparent to those skilled in the art that variations and modifications there of can be made without departing from the underlying principles of the invention.

We claim:

1. In combination, a tractor having hitch means, a source of fluid pressure, a fluid reservoir, a remote hydraulic motor outlet, a servo control valve movable from the source and reservoir, and means operatively associated with the control valve and hitch means responsive to draft loads imposed upon the hitch means to move the control valve from the neutral position to connect the outlet with the source and reservoir in response to increases and decreases, respectively, in the draft load; a transverse series of rigid frames pivotally connected at adjoining ends and movable vertically relative to one another; draft means interconnecting the frames and the tractor hitch means; vertically movable wheel means mounted on the frames for supporting the frames in spaced relation to the ground surface beneath the respective frames; there being at least one wheel means on each frame; extensible and retractable hydraulic motors mounted on the frames and connected to the respective wheel means; first fluid line means interconnecting the remote motor outlet with one of the motors; and further fluid line means interconnecting the motors in series with one another so that each frame of said series of frames is raised and lowered in unison with the other frames of the series in accordance with the total draft load on the hitch means.

2. The combination set forth in claim 1 wherein the hydraulic motors are cylinder means and each of the cylinder means has a piston movable within a cylinder and a piston rod extending to one side of the piston, the effective cross sectional area of the anchor end of the piston being greater than the effective cross sectional area of the rod end of the piston, the further fluid line means interconnects the rod end of one cylinder means with the anchor end of another cylinder means; and the rod end of each cylinder means is of substantially the same effective cross-sectional areas as the anchor end of the cylinder means to which it is connected by the further fluid line means, whereby the cylinder means will be extended and retracted in unison and the frame sections will be simultaneously moved equal vertical distances with respect to the ground surface beneath the respective frames in response to increases and decreases in the draft load.

3. The combination set forth in claim 2 wherein each of the cylinder means in series is provided with a fluid bypass circuit means to allow free flow of fluid when the cylinder means are moved to their limit in one direction to thereby insure that all of the cylinder means in series are moved to their limit in one direction.

4. In combination with a tractor having hitch means and a position and draft responsive power lift system including a tractor-mounted rockshaft, a tractor-mounted hydraulic motor operatively connected to the rockshaft, a source of fluid pressure, a fluid reservoir, and a control valve movable from a neutral position to selectively interconnect the motor with the source and reservoir, means operatively associated with the rockshaft, the hitch means and the control valve and selectively responsive to the angular position of the rockshaft and the draft forces imposed upon the hitch means or a combination of the two to move the control valve from the neutral position in response to selection of a rockshaft position other than the actual position and variations in the draft forces imposed upon the hitch means from a selected draft force, an earthworking implement comprising: a transverse series of frames interconnected at adjoining ends for independent vertical movement; draft means trailingly connecting the frames to the tractor hitch means; wheel means mounted on the frames for vertical movement relative to the frames; there being at least one wheel means on each frame; hydraulic motor means mounted on the frames and operatively connected to the wheel means to vertically move the wheel means relative to the respective frames; fluid line means connecting the frame-mounted motors in series; and further fluid line means connecting the frame-mounted motors to the power lift system in series between the control valve and tractor-mounted motor.

5. The combination set forth in claim 4 wherein the frame-mounted hydraulic motors are extensible and retractable cylinders having rod ends and anchor ends, the fluid line means interconnects the rod end of each cylinder with the anchor end of the next adjacent cylinder in the series; and the further fluid line means interconnects the anchor end of the first cylinder in the series and the rod end of the last cylinder in the series with the power lift system.

6. The combination set forth in claim 5 wherein the rod end of each cylinder in series has a displacement substantially equal to the displacement of the anchor end of the next adjacent cylinder in the series.

7. The combination set forth in claim 6 wherein each of the cylinders is provided with a fluid bypass circuit which affords free flow of fluid through the cylinders when they are moved to their limit in one direction.

8. The combination set forth in claim 4 where the tractor-mounted hydraulic motor is a single-acting extensible and retractable hydraulic cylinder, the frame-mounted hydraulic motors are double-acting extensible and retractable hydraulic cylinders, the further fluid line means interconnects the anchor end of the first cylinder in series with the control valve and the rod end of the last cylinder in series with the anchor end of the tractor-mounted cylinder, the first-mentioned fluid line means interconnects the rod end of each cylinder in series with the anchor end of the next adjacent cylinder in series; and the rod end of each cylinder has a displacement substantially equal to the displacement of the anchor end of the next adjacent cylinder.

9. The combination set forth in claim 8 wherein each of the frame-mounted cylinders is provided with a bypass circuit means which provides free flow of fluid through the frame-mounted cylinders when they are moved to their limit in one direction, and the further fluid line means is provided with a pressure relief valve between the tractor-mounted cylinder and the frame-mounted cylinder which is last in the series.

10. The combination set forth in claim 8 wherein each of the cylinders is provided with a bypass circuit means which affords free flow of fluid through the cylinders when they are moved to their limit in one direction.

11. The combination set forth in claim 10 wherein a pressure relief valve is provided in the further fluid line means between the tractor-mounted cylinder and the frame-mounted cylinder which is last in the series.

12. The combination of a tractor and a drawn implement, the tractor including hitch means and a position and draft responsive hydraulic system comprising: a tractor-mounted rockshaft and a hydraulic motor operatively connected to the rockshaft; a pair of tractor-mounted remote hydraulic motor outlets; a source of fluid pressure; a fluid reservoir; a servo control valve for the source and reservoir movable from a neutral position to supply and exhaust positions; a selector valve movable between a first position in which it interconnects the motor and the servo control valve and a second position in which it interconnects the motor with one of the outlets and the servo control valve with the other outlet; and means operatively associated with the rockshaft, the hitch means and the control valve and selectively responsive to the angular position of the rockshaft and the draft forces imposed upon the hitch means or a combination of the two to move the control valve from the neutral position in response to selection of a rockshaft position other than the actual position and variations in the draft forces imposed upon the hitch means from a selected draft force; and the implement comprises: a transverse series of frames connected at adjoining ends for independent vertical movement; wheel means adjustable mounted on each frame for vertical movement relative to the respective frames; hydraulic motor means mounted on each frame and operably connected to the respective wheel means to vertically adjust the wheel means relative to the respective frames; first fluid line means interconnecting one of the hydraulic motor means with the one of the remote hydraulic motor outlets; second fluid line means interconnecting another hydraulic motor means with the other remote hydraulic motor outlet; further fluid line means interconnecting the hydraulic motor means in series; and draft means trailingly connecting the frames to the tractor hitch means.

13. The combination set forth in claim 12 wherein the hydraulic motor is a single-acting extensible and retractable hydraulic cylinder, the hydraulic motor means are double-acting extensible and retractable hydraulic cylinders, the second fluid line means interconnects the anchor end of one double-acting cylinder with the other outlet, the first fluid line means interconnects the rod end of another double-acting cylinder with the one outlet, and the further fluid line means interconnects the rod end of each double-acting cylinder in series with the anchor end of the next adjacent double-acting cylinder in series.

14. The combination set forth in claim 13 wherein each of the double-acting cylinders is provided with a bypass circuit means which affords free flow of fluid through the cylinder when it has been fully extended, and a pressure relief valve is associated with the one outlet to return fluid to the fluid reservoir when the fluid pressure within the single-acting cylinder has reached a predetermined maximum value.

15. The combination set forth in claim 13 wherein each of the cylinders is provided with a bypass circuit means which affords free flow of fluid through the cylinders when they are moved to their limit in one direction.

16. The combination set forth in claim 15 wherein a pressure relief valve is associated with the one outlet to return fluid to the reservoir when the fluid pressure within the single-acting cylinder has reached a predetermined maximum value.

17. The combination set forth in claim 14 wherein the rod end of each double-acting cylinder in series has a displacement substantially equal to the displacement of the anchor end of the next adjacent double-acting cylinder in series, and the rod end of the last double-acting cylinder in series has a displacement substantially equal to the anchor end of the single-acting cylinder.

18. In a tractor and trailing implement arrangement in which the implement is adjustable mounted on support means and subject to variations in draft loads, double-acting extensible and retractable hydraulic cylinder means is mounted on the implement and operably connected to the support means for raising and lowering the implement, fluid line means interconnect the rod and anchor ends of the cylinder means with first and second remote cylinder outlets on the tractor, draft means trailingly connects the implement to hitch means on the tractor, the tractor has a position and draft responsive hydraulic system including a tractor-mounted rockshaft and a hydraulic cylinder operatively connnected thereto, a fluid pressure source, a fluid reservoir, a servo control valve for the source and reservoir movable to either side of a neutral position, and means operatively associated with the rockshaft, hitch means and control valve and selectively responsive to the angular position of the rockshaft and the draft forces imposed upon the hitch means or a combination of the two to move the control valve from the neutral position in response to selection of a rockshaft position other than the actual position and variations in the draft forces imposed upon the hitch means from a selected draft force, the improvement comprising: a selector valve movable between a first position in which it interconnects the tractor-mounted cylinder with the servo control valve and a second position in which it interconnects the tractor-mounted cylinder and the servo control valve with the first and second remote cylinder outlets respectively and means to bypass fluid past the tractor-mounted cylinder to the reservoir.

19. The combination set forth in claim 18 in which the last-mentioned means includes a bypass circuit means which affords free flow of fluid through the tractor-mounted cylinder when it has been fully extended.

20. The combination set forth in claim 19 wherein a pressure relief valve is connected between the tractor-mounted cylinder and the first remote cylinder outlet to return fluid to be reservoir when the fluid pressure within the tractor-mounted cylinder reaches a predetermined maximum value.

* * * * *

UNITED STATES PATENT OFFICE
CERTIFICATE OF CORRECTION

Patent No. 3,627,053　　　　　Dated 14 December 1971

Inventor(s) Richard Wayne Hook, William Wayne Jackson, Lamar Williams and Kenneth Earl Murphy It is certified that error appears in the above-identified patent and that said Letters Patent are hereby corrected as shown below:

Column 6, line 21, after "from" insert -- a neutral position to selectively interconnect the outlet with --; line 35, after "means" (1st occ.) insert -- for vertically adjusting the respective frames relative to the wheel means --.

Column 8, lines 9 and 55, change "adjustable" to -- adjustably --.

Column 10, line 7, change "be" to -- the --.

Signed and sealed this 11th day of July 1972.

(SEAL)
Attest:

EDWARD M. FLETCHER, JR.　　　　　ROBERT GOTTSCHALK
Attesting Officer　　　　　　　　Commissioner of Patents